United States Patent
Suzuki et al.

(10) Patent No.: US 11,777,430 B2
(45) Date of Patent: Oct. 3, 2023

(54) MOTOR DRIVE CONTROL DEVICE, MOTOR UNIT, AND MOTOR DRIVE CONTROL METHOD

(71) Applicant: MINEBEA MITSUMI Inc., Nagano (JP)

(72) Inventors: Takahiro Suzuki, Fukuroi (JP); Masato Aoki, Iwata (JP); Hiroyuki Kaidu, Kakegawa (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 17/659,355

(22) Filed: Apr. 15, 2022

(65) Prior Publication Data
US 2022/0345061 A1 Oct. 27, 2022

(30) Foreign Application Priority Data
Apr. 27, 2021 (JP) .................. 2021-075255

(51) Int. Cl.
*H02P 23/14* (2006.01)
*H02P 29/024* (2016.01)

(52) U.S. Cl.
CPC ............ *H02P 23/14* (2013.01); *H02P 29/024* (2013.01)

(58) Field of Classification Search
CPC .... H02P 23/14; H02P 29/024; H02P 23/0004; H02P 23/04; H02P 21/18; H02P 21/0003; H02P 21/14
USPC .................................... 318/461, 445
See application file for complete search history.

(56) References Cited

U.S. PATENT DOCUMENTS

| 5,729,104 A * | 3/1998 | Kamishima | H02H 7/0851 |
| | | | 318/473 |
| 10,461,674 B2* | 10/2019 | Yabuguchi | H02P 6/24 |
| 10,644,628 B2* | 5/2020 | Watanabe | H02P 6/15 |

FOREIGN PATENT DOCUMENTS

JP 2017-153224 A 8/2017

* cited by examiner

*Primary Examiner* — David Luo
(74) *Attorney, Agent, or Firm* — Pearne & Gordon LLP

(57) ABSTRACT

A motor drive control device includes: a feedback control unit calculating an operation amount (Sad) of a motor such that a rotation speed S3 of the motor matches a target rotation speed S1; a drive control signal generation unit generating a drive control signal Sd based on the operation amount Sad; a current fluctuation detection unit detecting a fluctuation of a current flowing through the motor; a correction instruction unit instructing correction of the operation amount Sad when the fluctuation of the current flowing through the motor is detected by the current fluctuation detection unit; and a correction unit correcting the operation amount Sad and providing the corrected operation amount S2 to the drive control signal generation unit when the correction of the operation amount Sad is instructed from the correction instruction unit.

8 Claims, 6 Drawing Sheets

| | CORRECTION EXAMPLE | |
|---|---|---|
| | DRIVE COMMAND SIGNAL Sd (PWM SIGNAL) | |
| | DUTY RATIO | UPDATE PERIOD OF PWM SIGNAL |
| 1 | REDUCTION | – |
| 2 | – | EXTENSION |
| 3 | REDUCTION | EXTENSION |

FIG. 4

| CORRECTION EXAMPLE | | CONTENT OF CORRECTION | SPECIFIC EXAMPLE |
|---|---|---|---|
| 1 | DUTY RATIO | - UPDATE PERIOD OF PWM SIGNAL: NO CHANGE<br>- DUTY RATIO: REDUCTION FROM D1 TO D2 |  |
| 2 | UPDATE PERIOD OF PWM SIGNAL | - UPDATE PERIOD OF PWM SIGNAL: EXTENSION FROM Tp1 TO Tp2<br>- DUTY RATIO: NO CHANGE | <br>Tp2>Tp1 |

# MOTOR DRIVE CONTROL DEVICE, MOTOR UNIT, AND MOTOR DRIVE CONTROL METHOD

CROSS-REFERENCE TO RELATED APPLICATIONS

This application claims the benefit of priority to Japanese Application No. JP2021-075255, filed Apr. 27, 2021, the entire disclosure of which is hereby incorporated herein by reference.

TECHNICAL FIELD

The present invention relates to a motor drive control device, a motor unit, and a motor drive control method.

BACKGROUND ART

Feedback control such as PI (Proportional-Integral) control and PID (Proportional-Integral-Differential) control is known as a method for controlling the number of rotations (rotation speed) of a motor.

For example, a motor drive control device adopting the PID control, by performing proportional (P) calculation, integral (I) calculation, and differential (D) calculation based on a deviation between a target rotation speed (target value) of a motor and an actual rotation speed (control amount), calculates an operation amount of the motor such that the deviation becomes 0 (zero), and drives the motor based on the operation amount (e.g., see Patent Document 1).

CITATION LIST

Patent Literature

Patent Document 1: JP 2017-153224 A

SUMMARY OF INVENTION

Technical Problem

However, when the rotation of the motor is controlled by the PI control or the PID control, there are the following problems.

For example, when the operation amount is not appropriate in a case where the PID control is performed so that the rotation speed of the motor becomes constant, an unstable state where the rotation speed of the motor fluctuates with a periodic beat at intervals of several seconds may occur. The unstable state of the motor is considered to be caused by the excessive operation amount of the motor, that is, the period (hereinafter also referred to as "feedback control period") for adjusting the power (current) provided to the motor is too short, or the power (current) provided to the motor per feedback control period is too large.

In the related art, whether a motor is in an unstable state is determined by, for example, observing, by a human, an actual motor operation sound and a motor current waveform. Therefore, when a specification change such as a change in the size of a motor is required in an application using the motor, a designer or the like adjusts the power to be provided to the motor per feedback control period, the feedback control period, and the like while observing the operation sound of the motor and the waveform of the current of the motor so that the motor operates stably. As a result, it has taken a lot of time to adjust the motor drive control algorithm at the time of specification change, or the like.

The present invention has been made to solve the above problem, and an object of the present invention is to automatically adjust the motor operation amount in motor drive control without depending on a result of observation of a motor operation state by a human.

Solution to Problem

A motor drive control device according to an exemplary embodiment of the present invention includes: a control circuit generating a drive control signal for controlling drive of a motor; and a drive circuit driving the motor in accordance with the drive control signal, wherein the control circuit includes: a feedback control unit calculating an operation amount of the motor such that a rotation speed of the motor matches a target rotation speed; a drive control signal generation unit generating the drive control signal based on the operation amount; a current fluctuation detection unit detecting a fluctuation of a current flowing through the motor; a correction instruction unit instructing correction of the operation amount when the fluctuation of the current flowing through the motor is detected by the current fluctuation detection unit; and a correction unit correcting the operation amount calculated by the feedback control unit in accordance with an instruction from the correction instruction unit, and, when the correction of the operation amount is not instructed from the correction instruction unit, the correction unit provides the operation amount calculated by the feedback control unit to the drive control signal generation unit without correcting the operation amount, and when the correction of the operation amount is instructed from the correction instruction unit, the correction unit corrects the operation amount calculated by the feedback control unit and provides the operation amount to the drive control signal generation unit.

Advantageous Effects of Invention

One aspect of the present invention enables the operation amount of the motor in the motor drive control to be automatically adjusted without depending on a result of observation of a motor operation state by a human.

BRIEF DESCRIPTION OF DRAWINGS

FIG. 4 is a diagram illustrating an example of a correction method of an operation amount by a correction unit.

DESCRIPTION OF EMBODIMENTS

1. Overview of Embodiments

Figure 1:
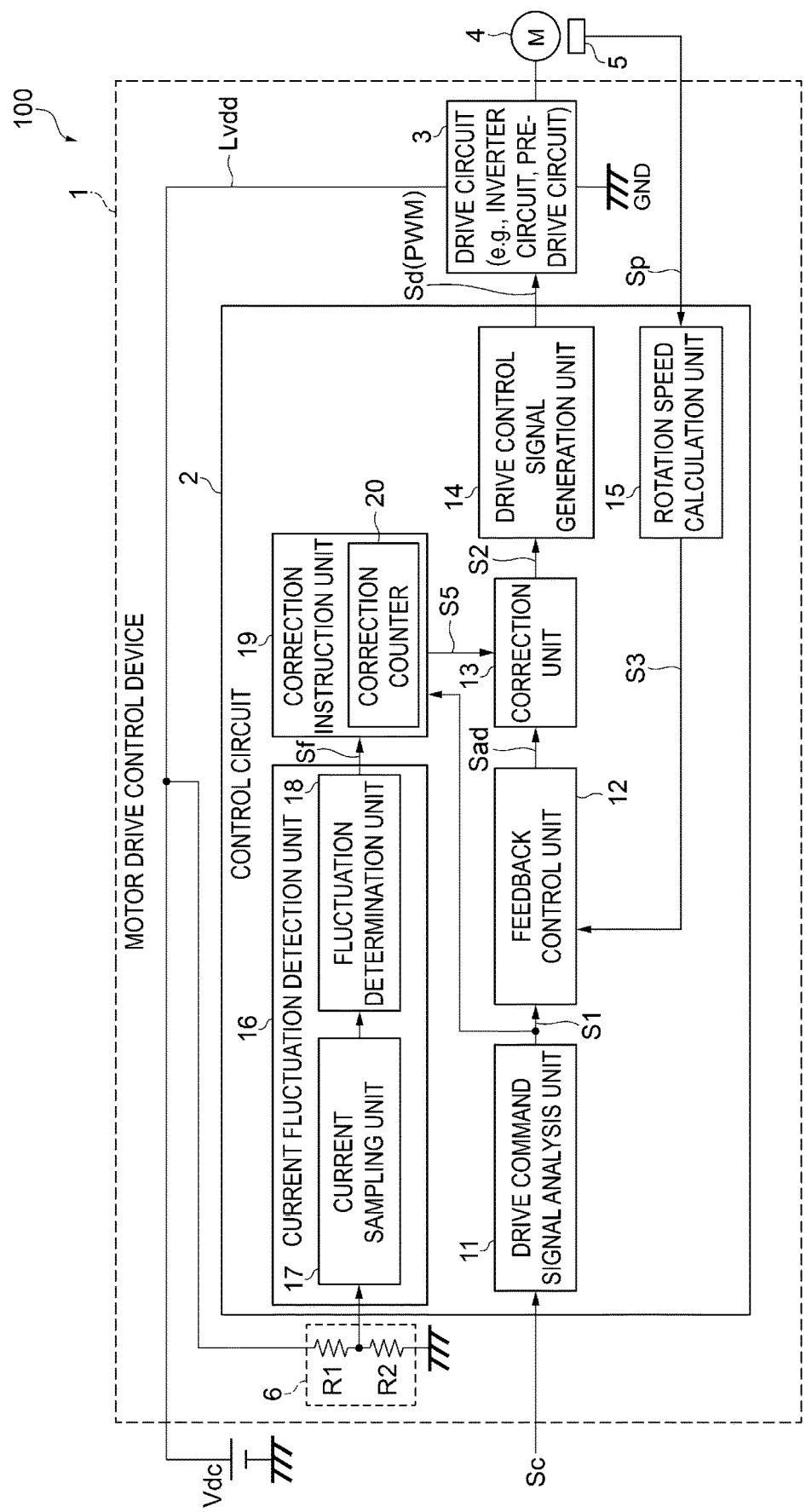
FIG. 1 is a diagram illustrating a configuration of a motor unit including a motor drive control device according to an embodiment of the present invention.

First, an overview of typical embodiments of the invention disclosed in the present application will be described. In the following description, reference signs in the drawings corresponding to the components of the invention are illustrated in parentheses, as an example.

[1] A motor drive control device (1) according to a typical embodiment of the present invention includes: a control circuit (2) generating a drive control signal (Sd) for controlling drive of a motor (4); and a drive circuit (3) driving the motor in accordance with the drive control signal, wherein the control circuit includes: a feedback control unit (12) calculating an operation amount (Sad) of the motor such that a rotation speed of the motor matches a target rotation speed (S1); a drive control signal generation unit (14) generating the drive control signal based on the operation amount; a current fluctuation detection unit (16) detecting a fluctuation of a current flowing through the motor; a correction instruction unit (19) instructing correction of the operation amount when the fluctuation of the current flowing through the motor is detected by the current fluctuation detection unit; and a correction unit (13) correcting the operation amount calculated by the feedback control unit in accordance with an instruction from the correction instruction unit, and when the correction of the operation amount is not instructed from the correction instruction unit, the correction unit provides the operation amount calculated by the feedback control unit to the drive control signal generation unit without correcting the operation amount, and when the correction of the operation amount is instructed from the correction instruction unit, the correction unit corrects the operation amount calculated by the feedback control unit and provides the operation amount to the drive control signal generation unit.

[2] In the motor drive control device according to the above [1], the correction instruction unit may instruct the correction of the operation amount when a periodic fluctuation of the current flowing through the motor is detected by the current fluctuation detection unit.

[3] In the motor drive control device according to the above [1] or [2], the correction instruction unit may further include a correction counter (20) counting the number of times the fluctuation of the current flowing through the motor is detected by the current fluctuation detection unit, and the correction unit may increase an amount of the correction of the operation amount in a stepwise manner according to the count value of the correction counter.

[4] In the motor drive control device according to any one of the above [1] to [3], the correction unit may perform, as the correction of the operation amount, at least one of reducing the operation amount to be provided to the drive control signal generation unit and lengthening a period for updating the operation amount to be provided to the drive control signal generation unit.

[5] In the motor drive control device according to the above [4], the drive control signal is a PWM signal, the feedback control unit calculates a value specifying a duty ratio of the PWM signal as the operation amount, and the correction unit may correct the operation amount such that the value specifying the duty ratio calculated by the feedback control unit becomes smaller.

[6] In the motor drive control device according to the above [4], the drive control signal is a PWM signal, the feedback control unit calculates a value specifying a duty ratio of the PWM signal as the operation amount, and the correction unit may correct the operation amount such that a period for updating and outputting the value specifying the duty ratio calculated by the feedback control unit becomes longer.

[7] A motor unit (100) according to an exemplary embodiment of the present invention includes the motor drive control device (1) according to any one of the above [1] to [6], and the motor (4).

[8] A method according to a typical embodiment of the present invention is a motor drive control method by a motor drive control device (1) including: a control circuit (2) generating a drive control signal (Sd) for controlling drive of a motor (4); and a drive circuit (3) driving the motor in accordance with the drive control signal. The method includes: a first step (S12) of calculating, by the control circuit, an operation amount (Sad) of the motor such that a rotation speed (S3) of the motor matches a target rotation speed (S1); a second step (S12) of generating, by the control circuit, the drive control signal based on the operation amount; and a third step (S16 to S18) of correcting, by the control circuit, the operation amount calculated in the first step when a fluctuation of current flowing through the motor is detected.

2. Specific Examples of Embodiments

Specific examples of the embodiments according to the present invention will be described below with reference to the drawings. In the following description, components common to the respective embodiments are denoted by the same reference signs, and repeated descriptions are omitted.

Embodiments

FIG. 1 is a diagram illustrating a configuration of a motor unit including a motor drive control device according to an embodiment of the present invention.

A motor unit 100 illustrated in FIG. 1 includes a motor 4, a position detection device 5, and a motor drive control device 1.

The motor 4 is, for example, a brushless DC motor including a single-phase coil (winding).

The position detection device 5 is a device generating a position detection signal Sp corresponding to the rotation of a rotor of the motor 4. The position detection device 5 is, for example, a Hall element. For example, a Hall element corresponding to the coil of the motor 4 is arranged around the rotor of the motor 4 as the position detection device 5. The Hall element detects the magnetic pole of the rotor, generates and outputs a Hall signal having a voltage changing according to the rotation of the rotor. The Hall signal output from the Hall element is input to the motor drive control device 1 as the position detection signal Sp. The position detection signal Sp is, for example, a pulse signal.

The motor drive control device 1 is a device controlling the drive of the motor 4. The motor drive control device 1 detects the rotation state of the motor 4 by obtaining information such as the rotation position and the rotation speed of the motor 4 based on the position detection signal Sp output from the position detection device 5, and controls the driving of the motor 4.

In place of the Hall element described above, for example, an encoder or a resolver may be provided as the position detection device 5, and a detection signal of the encoder or the resolver may be input as the position detection signal Sp to the motor drive control device 1. When the motor drive control device 1 performs drive control of the motor 4 based on a position sensorless method, the position detection device 5 may not be provided.

The motor drive control device 1 includes, for example, a control circuit 2 and a drive circuit 3.

The motor drive control device 1 is supplied with a DC voltage Vdc from an external DC power source. The DC voltage Vdc is supplied to a power line Lvdd via a protection circuit or the like (not illustrated), and is input to the control circuit 2 and the drive circuit 3 as a power supply voltage via the power line Lvdd.

The power line Lvdd is a power supply path supplying power to the control circuit 2 and supplying power for driving the motor 4 via the drive circuit 3, and is, for example, a wiring. In addition to the wiring, the power line Lvdd may be connected with a stabilizing capacitor for stabilizing the voltage of the power line Lvdd, the protection circuit described above, or the like.

Note that the voltage of the power line Lvdd is not directly supplied to the control circuit 2, and, for example, the voltage obtained by reducing the voltage of the power line Lvdd by the regulator circuit may be supplied to the control circuit 2 as the power supply voltage.

The drive circuit 3 is a circuit driving the motor 4 based on a drive control signal Sd output from the control circuit 2 described later. The drive control signal Sd is a signal for controlling the drive of the motor 4, and is, for example, a pulse width modulation (PWM) signal.

The drive circuit 3 switches the direction of the motor current to rotate the motor 4 by switching the connection destination of the coil of the motor 4 between the power line Lvdd and the ground potential GND based on the PWM signal serving as the drive control signal Sd. For example, the drive circuit 3 includes an inverter circuit (not illustrated) including a plurality of switch elements (e.g., transistors), and a pre-drive circuit (not illustrated) for generating a plurality of drive signals for supplying sufficient power to drive the respective switch elements of the inverter circuit based on the drive control signal Sd.

The control circuit 2 is a circuit for centrally controlling the operation of the motor drive control device 1. In the present embodiment, the control circuit 2 is a program processing device configured such that a processor such as a CPU, various storage devices such as a RAM, a ROM, and a flash memory, and peripheral circuits such as a counter (timer), an A/D conversion circuit, a D/A conversion circuit, a clock generation circuit, and an input/output interface circuit are connected to each other via a bus or a dedicated line. For example, the control circuit 2 is a micro controller unit (MCU).

The control circuit 2 and the drive circuit 3 may be configured to be packaged as one semiconductor integrated circuit (IC), or may be configured to be packaged as individual integrated circuit devices, mounted at a circuit board, and electrically connected to each other at the circuit board.

The control circuit 2 has a function of controlling energization of the motor 4 by generating the drive control signal Sd and providing the drive control signal Sd to the drive circuit 3. Specifically, based on a drive command signal Sc for instructing a target value related to driving of the motor 4 input from the outside (e.g., a host device) and the position detection signal Sp input from the position detection device 5, the control circuit 2 performs feedback control for calculating an operation amount Sad so that the motor 4 is in the drive state specified by the drive command signal Sc. The control circuit 2 generates a drive control signal Sd corresponding to the calculated operation amount Sad and provides the drive control signal Sd to the drive circuit 3.

The control circuit 2 also has a function of monitoring the current (hereinafter also referred to as "motor current") flowing through the coil of the motor 4 and correcting the operation amount Sad calculated based on the feedback control when the fluctuation of the motor current is detected.

As illustrated in FIG. 1, the control circuit 2 includes, for example, a drive command signal analysis unit 11, a feedback control unit 12, a correction unit 13, a drive control signal generation unit 14, a rotation speed calculation unit 15, a current fluctuation detection unit 16, and a correction instruction unit 19 as function units for implementing the above-described functions.

Each of the above-described function units of the control circuit 2 is implemented, for example, by program processing by the MCU serving as the control circuit 2. Specifically, the processor constituting the MCU serving as the control circuit 2 performs various calculations in accordance with the program stored in the memory to control the various peripheral circuits constituting the MCU, so that the aforementioned function units are implemented.

The drive command signal analysis unit 11 receives, for example, a drive command signal Sc output from a host device (not illustrated). The drive command signal Sc is a signal for instructing a target value related to driving of the motor 4 as described above, and is, for example, a speed command signal for instructing a target rotation speed of the motor 4.

The drive command signal analysis unit 11 analyzes the target rotation speed specified by the drive command signal Sc. For example, when the drive command signal Sc is a PWM signal having a duty ratio corresponding to the target rotation speed, the drive command signal analysis unit 11 analyzes the duty ratio of the drive command signal Sc and outputs information of the rotation speed corresponding to the duty ratio as a target rotation speed S1.

The rotation speed calculation unit 15 is a function unit measuring the rotation speed of the motor 4. The rotation speed calculation unit 15 measures the rotation speed of the motor 4 based on the position detection signal (Hall signal) Sp of the Hall element serving as the position detection device 5, and outputs the measurement result as the rotation speed (actual rotation speed) S3.

The feedback control unit 12 is a function unit calculating the operation amount Sad of the motor 4 so that the rotation speed S3 of the motor 4 matches the target rotation speed S1. Specifically, the feedback control unit 12 calculates the operation amount Sad of the motor 4 such that the deviation between the target rotation speed S1 output from the drive command signal analysis unit 11 and the rotation speed S3 output from the rotation speed calculation unit 15 is 0 (zero). The feedback control unit 12 calculates the operation amount Sad of the motor 4 for each preset period (feedback control period), for example. That is, the operation amount Sad is updated for each preset feedback control period.

Figure 2:
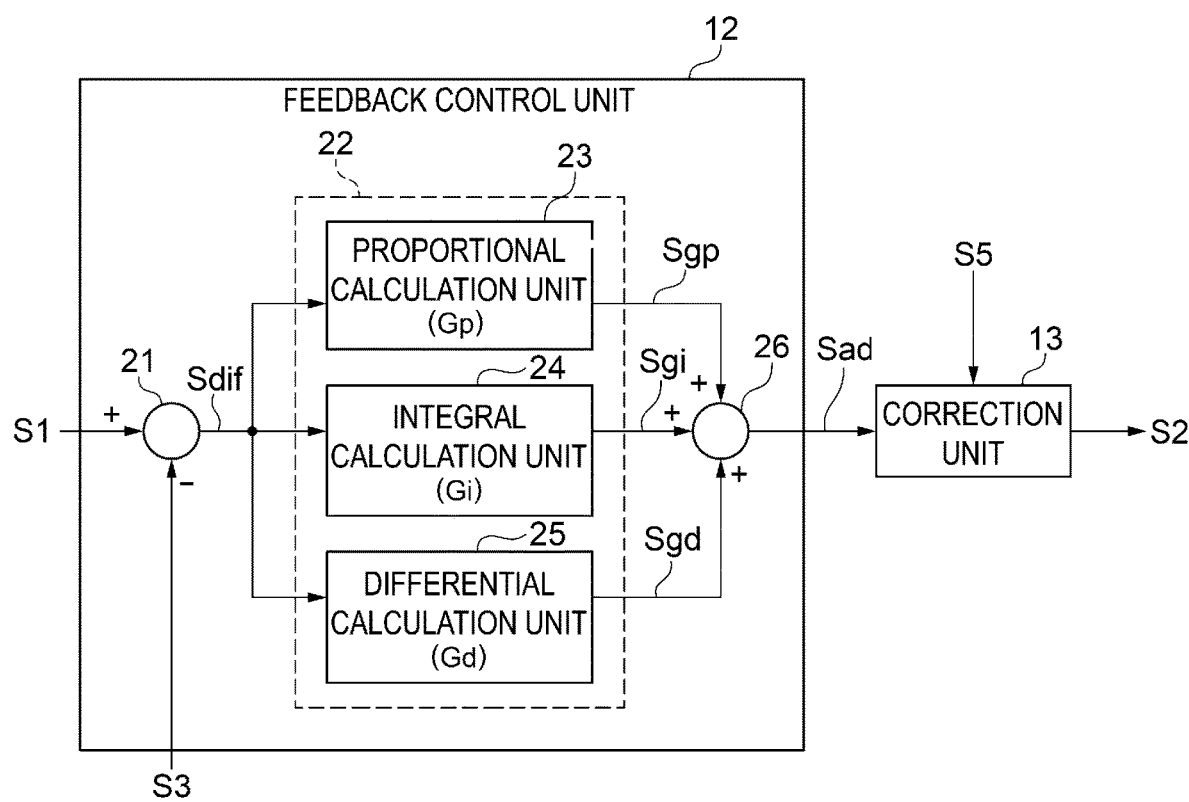
FIG. 2 is a diagram illustrating an example of a configuration of a feedback control unit.

FIG. 2 is a diagram illustrating an example of a configuration of a feedback control unit.

As illustrated in FIG. 2, the feedback control unit 12 has, as a specific example, a function of performing PID control and includes, for example, a subtractor 21, a PID controller 22, and an adder 26. The subtractor 21 calculates the difference between the target rotation speed S1 and the rotation speed S3, and outputs the difference (deviation) as a rotation speed error Sdif. The PID controller 22 performs a PID calculation based on the rotation speed error Sdif output from the subtractor 21. Specifically, the PID controller 22 includes a proportional (P) calculation unit 23, an integral (I) calculation unit 24, and a differential (D) calculation unit 25.

The proportional calculation unit 23 calculates the proportional calculation value Sgp by multiplying the rotation speed error Sdif output from the subtractor 21 by the proportional gain Gp. The integral calculation unit 24 multiplies the rotation speed error Sdif by an integral gain Gi and temporally integrates the multiplied value to calculate an integral calculation value Sgi. The differential calculation unit 25 multiplies the rotation speed error Sdif by a differential gain Gd and temporally differentiates the multiplied value to calculate a differential calculation value Sgd.

The adder 26 outputs the sum of the proportional calculation value Sgp, the integral calculation value Sgi, and the differential calculation value Sgd as the operation amount Sad of the motor 4.

Here, the operation amount Sad includes information specifying the drive amount of the motor 4 required to match the rotation speed S3 of the motor 4 to the target rotation speed S1. For example, in driving the motor 4 by PWM as in the present embodiment, the operation amount Sad includes a value specifying a duty ratio (=a ratio of a pulse on-time to one PWM period) of the drive control signal Sd being the PWM signal. The operation amount Sad is updated for each preset feedback control period and output from the adder 26.

The current fluctuation detection unit 16 is a function unit monitoring a current flowing through the motor 4 (motor current) and determines whether the motor current fluctuates. The current fluctuation detection unit 16 outputs a fluctuation detection signal Sf when detecting a fluctuation of the motor current. More preferably, the current fluctuation detection unit 16 outputs the fluctuation detection signal Sf when detecting a periodic fluctuation of the motor current.

As illustrated in FIG. 1, the current fluctuation detection unit 16 includes a current sampling unit 17 and a fluctuation determination unit 18. The current sampling unit 17 samples the motor current every unit time, converts the sampled value into a digital signal, and outputs the digital signal to the fluctuation determination unit 18.

In the present embodiment, a current detection circuit 6 is provided between the power line Lvdd and the ground potential in order to detect the motor current. The current detection circuit 6 is, for example, a voltage-dividing circuit including resistance R1 and R2 connected in series between the power line Lvdd and the ground potential. For example, when the motor 4 is driven, power is supplied to the motor 4 via the power line Lvdd and the drive circuit 3. At this time, since a current flows through the power line Lvdd, the voltage of the power line Lvdd fluctuates accompanied by the fluctuation of the motor current due to the parasitic resistance existing at the power line Lvdd. The current detection circuit 6 is a circuit detecting the fluctuation of the power supply voltage as a fluctuation of the power supply current (motor current).

The voltage detected by the current detection circuit 6 is input to the current sampling unit 17. The current sampling unit 17 samples the voltage input from the current detection circuit 6 as a measured value of the motor current.

In the present embodiment, a case of providing the current detection circuit 6 between the power line Lvdd and the ground potential to detect the motor current has been described as an example, but the approach of monitoring the motor current is not limited to this case. For example, as an approach of monitoring the motor current, a resistance may be connected between an inverter circuit constituting the drive circuit 3 and the ground potential to detect the motor current, or a circuit for monitoring the current (phase current) of each phase of the motor 4 may be provided.

The fluctuation determination unit 18 is a function unit determining whether the motor current fluctuates based on the sampling value of the motor current measured by the current sampling unit 17. Here, the sampling value used for determining the fluctuation of the motor current is, for example, a peak value of the motor current.

Specifically, the fluctuation determination unit 18 determines whether the motor current fluctuates by comparing the sampling values of the motor current by the current sampling unit 17. For example, the fluctuation determination unit 18 detects the maximum value and the minimum value of the current sampling values in a fixed period, and determines that the motor current fluctuates when the difference between the maximum value and the minimum value exceeds a predetermined threshold value.

Figure 3:
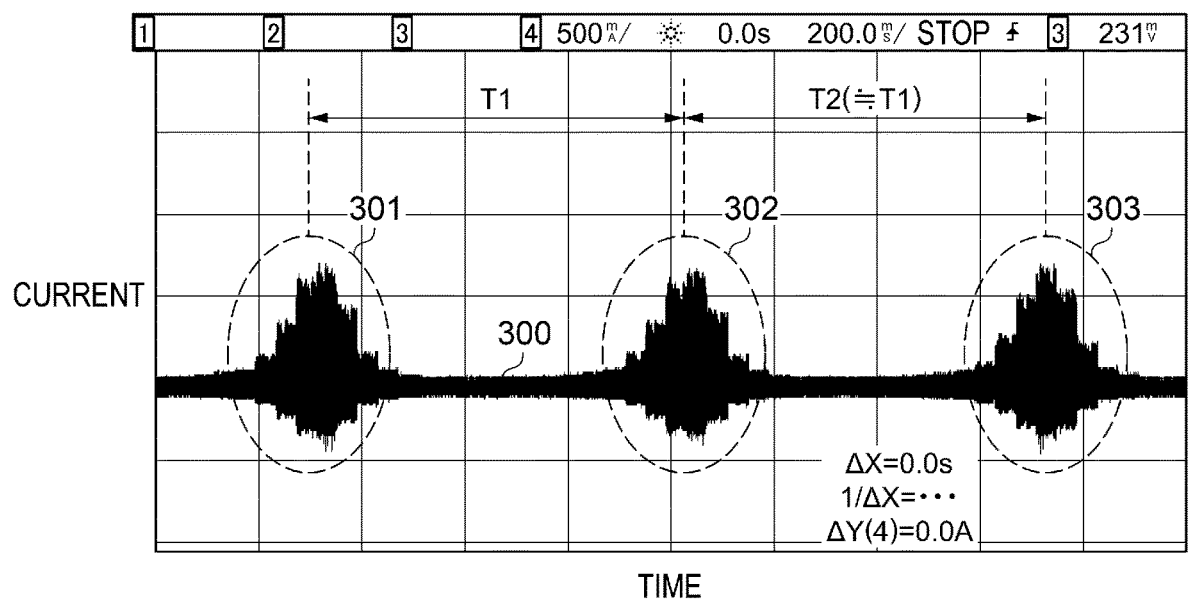
FIG. 3 is a diagram illustrating an example of a periodic fluctuation of a motor current.

FIG. 3 is a diagram illustrating an example of a periodic fluctuation of the motor current.

In FIG. 3, the horizontal axis represents time, and the vertical axis represents current. A reference sign 300 denotes a temporal change in the current (motor current) flowing through the motor 4.

As described above, even when the drive command signal Sc input from the outside has a constant value, in a case where the operation amount (electric power) provided to the motor in the motor feedback control is not appropriate, an unstable state where the rotation speed of the motor fluctuates with a periodic beat at intervals of several seconds occurs. In this case, as illustrated in FIG. 3, the motor current fluctuates periodically.

In the present embodiment, the current fluctuation detection unit 16 detects fluctuation of the motor current. More preferably, the current fluctuation detection unit 16 detects periodic fluctuation of the motor current as illustrated in FIG. 3. For example, the fluctuation determination unit 18 calculates a difference between the maximum value and the minimum value of the sampling values at fixed time intervals, and determines whether a state where the difference exceeds a predetermined threshold value occurs periodically.

For example, as illustrated in FIG. 3, it is assumed that the fluctuation determination unit 18 detects that the difference between the maximum value and the minimum value of the sampling values exceeds a predetermined threshold value in a range (also called a range 301) indicated by a reference sign 301, a range (also called a range 302) indicated by a reference sign 302, and a range (also called a range 303) indicated by a reference sign 303.

In this case, the fluctuation determination unit 18 determines whether a time interval T1 between the range 301 where the first motor current fluctuation is detected and the range 302 where the second motor current fluctuation is detected and a time interval T2 between the range 302 where the second motor current fluctuation is detected and the range 303 where the third motor current fluctuation is detected are substantially match each other (e.g., within an error range of ±20%). When the interval T1 and the interval T2 substantially match each other, the fluctuation determination unit 18 determines that a periodic fluctuation of the motor current has occurred and outputs a fluctuation detection signal Sf.

In the above example, the fluctuation determination unit 18 determines that a periodic fluctuation of the motor current has occurred when a fluctuation of the motor current has been detected three times at predetermined intervals, but the present embodiment is not limited to this example, and the fluctuation determination unit 18 may determine that a periodic fluctuation of the motor current has occurred promptly when a fluctuation of the motor current has been detected two times at predetermined intervals, or the fluctuation determination unit 18 may determine that a periodic fluctuation of the motor current has occurred when a fluctuation of the motor current is detected four times or more at predetermined intervals.

The correction instruction unit 19 is a function unit instructing correction of the operation amount Sad.

The correction instruction unit 19 instructs the correction unit 13 to correct the operation amount Sad calculated by the feedback control unit 12 in accordance with the fluctuation detection signal Sf output from the fluctuation determination unit 18. The correction instruction unit 19 does not instruct correction of the operation amount Sad when a fluctuation of the motor current is not detected by the current fluctuation detection unit 16. On the other hand, when a fluctuation of the motor current is detected by the current fluctuation detection unit 16, the correction instruction unit 19 instructs correction of the operation amount Sad.

The correction instruction unit 19 includes a correction counter 20 counting, for example, the number of times a fluctuation of the motor current has been detected by the current fluctuation detection unit 16. The correction instruction unit 19 outputs the count value of the correction counter 20 as a correction instruction signal S5.

The correction instruction unit 19 increments the correction counter 20 (n→+1) each time the fluctuation detection signal Sf is output from the fluctuation determination unit 18. On the other hand, the correction instruction unit 19 resets the correction counter 20 (n→0), for example, when the motor drive control device 1 is started, when the target rotation speed S1 specified by the drive command signal Sc is changed, when the input content of the drive command signal Sc is changed, or the like.

The correction unit 13 is a function unit correcting the operation amount Sad calculated by the feedback control unit 12 in accordance with an instruction from the correction instruction unit 19.

When correction of the operation amount Sad is not instructed by the correction instruction signal S5, that is, when the count value of the correction counter 20 is 0 (zero), the correction unit 13 does not correct the operation amount Sad calculated by the feedback control unit 12 and provides the operation amount Sad directly as the operation amount S2 to the drive control signal generation unit 14. For example, when the feedback control unit 12 updates the operation amount Sad every period Tp1 (feedback control period), the correction unit 13 provides the operation amount Sad output from the feedback control unit 12 to the drive control signal generation unit 14 with the same period as the period for calculating the operation amount Sad by the feedback control unit 12. In other words, the correction unit 13 updates the operation amount Sad and provide the operation amount Sad to the drive control signal generation unit 14 each time the feedback control unit 12 calculates the operation amount Sad.

On the other hand, when correction of the operation amount Sad is instructed by the correction instruction signal S5, that is, when the count value of the correction counter 20 is one or more, the correction unit 13 corrects the operation amount Sad calculated by the feedback control unit 12 and provides the corrected operation amount S2 to the drive control signal generation unit 14. A correction method by the correction unit 13 will be described below with reference to the drawings.

FIG. 4 is a diagram illustrating an example of the correction method of the operation amount Sad by the correction unit 13.

Figure 5:
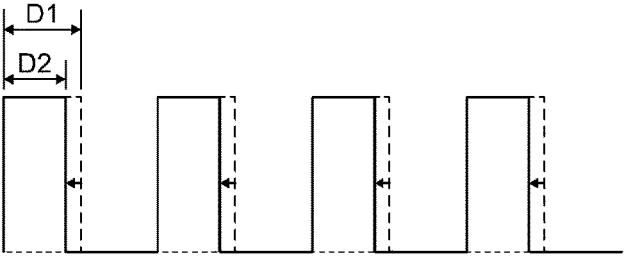
FIG. 5 is a diagram illustrating a concept of correction of the operation amount.
Figure 5:
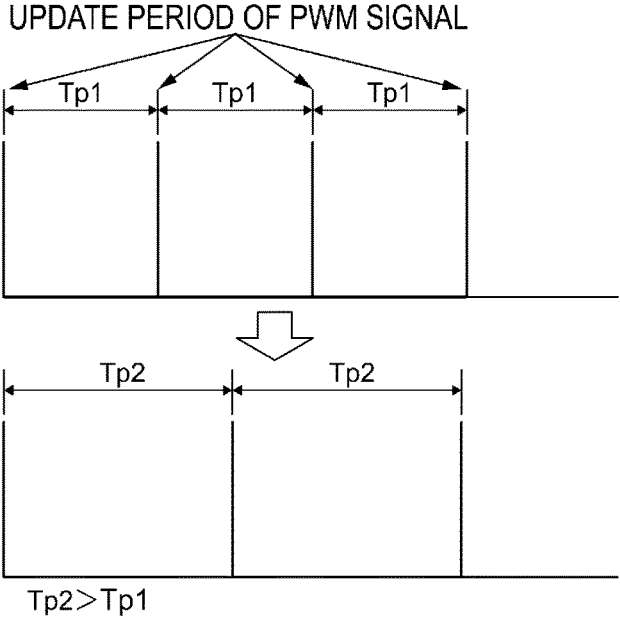

FIG. 5 is a diagram illustrating a concept of correction of the operation amount Sad.

As a specific method of correcting the operation amount Sad by the correction unit 13, two approaches illustrated in FIG. 4 can be exemplified.

As illustrated in FIG. 4, as a first correction example (correction example 1), the correction unit 13 corrects the operation amount Sad in a manner to decrease (reduce) the duty ratio of the PWM signal as the drive control signal Sd. Specifically, the correction unit 13 outputs an operation amount S2 including a value smaller than a value specifying the duty ratio of the PWM signal included in the operation amount Sad.

For example, as illustrated in the correction example 1 of FIG. 5, when the duty ratio of the PWM signal specified by the operation amount Sad is D1%, the correction unit 13 outputs the corrected operation amount S2 including a value specifying a duty ratio D2% smaller than the duty ratio D1% specified by the operation amount Sad.

As a result, since the duty ratio of the drive control signal Sd is smaller than the duty ratio in the case where the motor 4 is driven based on the operation amount Sad obtained simply by the PID control calculation, the power (current) provided to the motor 4 (coil) can be reduced.

Next, as illustrated in FIG. 4, as the second correction example (correction example 2), the correction unit 13 corrects the operation amount Sad in a manner to extend the period for updating the value specifying the duty ratio of the PWM signal to be provided to the drive control signal generation unit 14. That is, the correction unit 13 makes the period for updating the duty ratio of the drive control signal Sd longer than the period for calculating the operation amount Sad by the feedback control unit 12.

For example, when the operation amount Sad is not corrected as illustrated in the upper part of the specific example of the correction example 2 in FIG. 5, the correction unit 13 updates the operation amount Sad to be provided to the drive control signal generation unit 14 with the same period as the period Tp1 (feedback control period) for calculating the operation amount Sad by the feedback control unit 12 as described above.

On the other hand, the operation amount Sad is corrected as illustrated in the lower part of the specific example of correction example 2 in FIG. 5, the correction unit 13 updates the operation amount S2 to be provided to the drive control signal generation unit 14 with the period Tp2 longer than the period Tp1 (feedback control period) for calculating the operation amount Sad by the feedback control unit 12. Thus, the drive control signal generation unit 14 receives the operation amount S2 (=Sad) at the timing by (Tp2−Tp1) later than the timing when the operation amount Sad is updated by the feedback control unit 12.

Accordingly, since the substantial feedback control period is longer than the preset feedback control period, the power provided to the motor 4 can be gradually changed.

The correction unit 13 may correct the operation amount Sad by combining the first correction example and the second correction example described above. For example, when the duty ratio of the PWM signal (drive control signal Sd) specified by the operation amount Sad calculated by the feedback control unit 12 is D1%, and the period for updating the operation amount Sad to be provided to the drive control signal generation unit 14 is Tp1, the correction unit 13 corrects the operation amount Sad such that the duty ratio of the PWM signal is D2% smaller than D1%, and provides the corrected operation amount S2 to the drive control signal generation unit 14 in a period Tp2 longer than the period Tp1.

Thus, the power provided to the motor 4 can be further reduced.

In this manner, the correction unit 13 performs, as the correction of the operation amount, at least one of reducing the operation amount to be provided to the drive control signal generation unit 14 (the first correction example) and lengthening the period for updating the operation amount to be provided to the drive control signal generation unit 14 (the second correction example).

More preferably, the correction unit 13 may increase the amount of correction of the operation amount Sad in a stepwise manner according to the count value of the correction counter 20 (correction instruction signal S5).

For example, when the count value of the correction counter 20 is "n (n is an integer equal to or greater than one)", the correction unit 13 may correct the operation amount Sad such that the duty ratio of the drive control signal Sd is reduced by "n×Δd" based on the correction example 1. Here, Δd is a unit reduction rate of the duty ratio.

For example, the correction unit 13 corrects the operation amount Sad such that the duty ratio of the drive control signal Sd is reduced by "1×Δd" when the count value of the correction counter 20 is "1", and the duty ratio of the drive control signal Sd is reduced by "2×Δd" when the count value of the correction counter 20 is "2".

For example, when the count value of the correction counter 20 is "n", the correction unit 13 may correct the operation amount Sad based on the correction example 2 such that the period for updating the operation amount S2 (=Sad) to be provided to the drive control signal generation unit 14 is lengthened by "n×ΔT". Here, ΔT is a unit extension time of the update period.

For example, the correction unit 13 corrects the operation amount Sad such that the period for updating the operation amount S2 (=Sad) to be provided to the drive control signal generation unit 14 is lengthened by "1×ΔT" when the count value of the correction counter 20 is "1", and the period for updating the operation amount S2 (=Sad) to be provided to the drive control signal generation unit 14 is lengthened by "2×ΔT" when the count value of the correction counter 20 is "2".

The correction unit 13 may correct the operation amount Sad such that the duty ratio of the drive control signal Sd and the period for updating the operation amount S2 (=Sad) to be provided to the drive control signal generation unit 14 change in a stepwise manner according to the count value of the correction counter 20.

For example, the correction unit 13 corrects the operation amount Sad such that, when the count value of the correction counter 20 is "1", the period for updating the operation amount S2 (=Sad) to be provided to the drive control signal generation unit 14 is lengthened by ΔT, and when the count value of the correction counter 20 is "2", the period for updating the operation amount S2 (=Sad) to be provided to the drive control signal generation unit 14 is lengthened by "ΔT" and the duty ratio of the drive control signal Sd is decreased by "Δd".

Further, when the count value of the correction counter 20 is "3", the correction unit 13 may correct the operation amount Sad such that the period for updating the operation amount S2 (=Sad) to be provided to the drive control signal generation unit 14 is increased by 2×ΔT and the duty ratio of the drive control signal Sd is decreased by "Δd".

When the count value of the correction counter 20 is reset (count value=0), the correction unit 13 stops the correction of the operation amount, and, as described above, provides the operation amount Sad calculated by the feedback control unit 12 to the drive control signal generation unit 14 as the operation amount S2 without correction.

The following description will be given on the assumption that the correction unit 13 corrects the operation amount Sad such that at least one of the duty ratio of the drive control signal Sd and the period for updating the operation amount S2 (=Sad) to be provided to the drive control signal generation unit 14 changes in a stepwise manner according to the count value (correction instruction signal S5) of the correction counter 20 as described above.

The drive control signal generation unit 14 is a function unit generating a drive control signal Sd as a PWM signal based on the operation amount S2 output from the correction unit 13. Specifically, the drive control signal generation unit 14 generates a PWM signal having the duty ratio specified by the operation amount S2 provided from the correction unit 13 and outputs the PWM signal as the drive control signal Sd. Whenever the duty ratio value specified by the operation amount S2 is updated, the drive control signal generation unit 14 changes and outputs the duty ratio of the drive control signal Sd.

The drive control signal Sd is provided to the drive circuit 3, and the drive circuit 3 drives the motor 4 based on the drive control signal Sd. As a result, the motor 4 rotates to achieve the target rotation speed S1 while suppressing the fluctuation of the motor current.

Next, a sequence of processing of correcting the operation amount by the motor drive control device 1 according to the present embodiment will be described.

Figure 6:
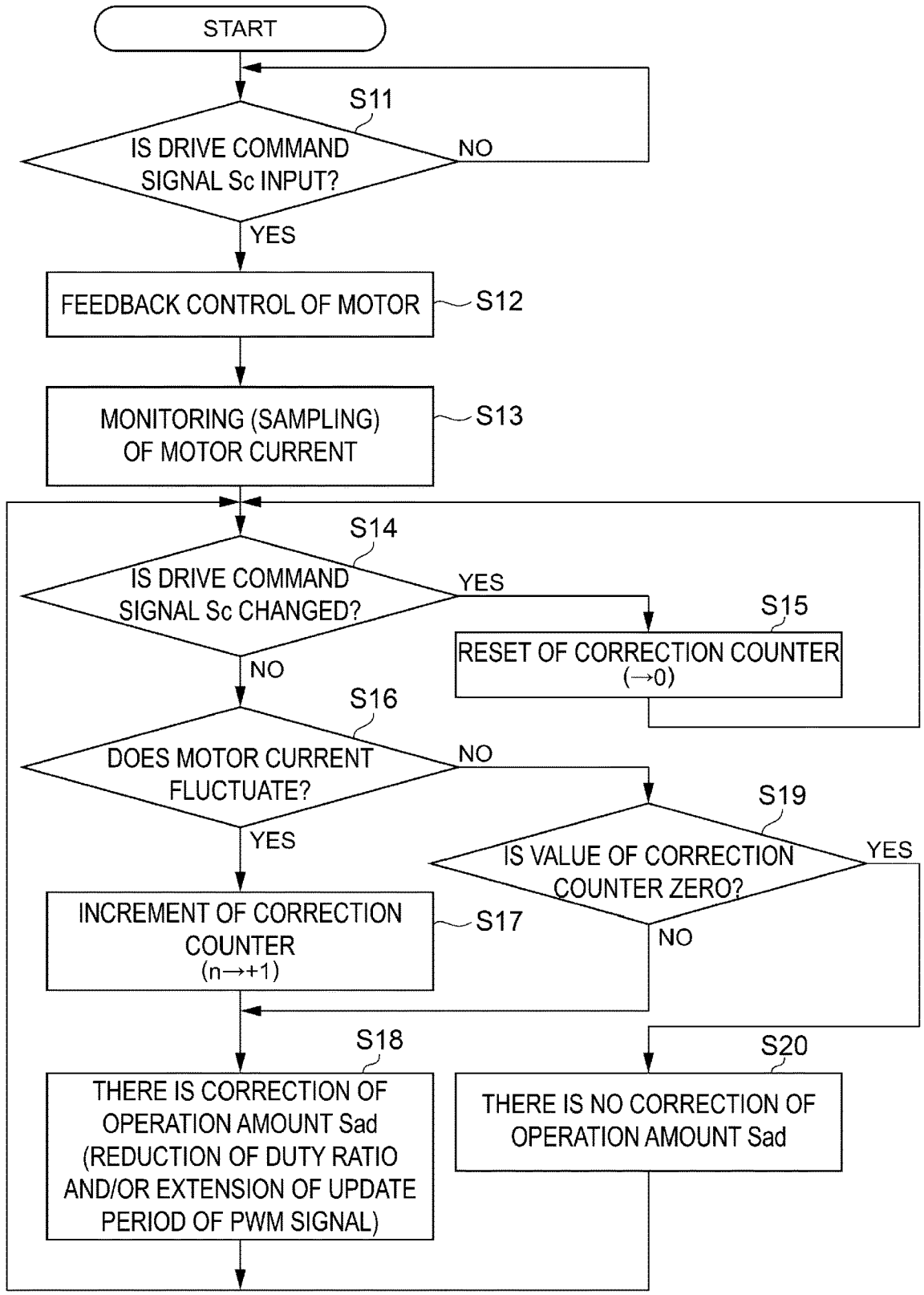
FIG. 6 is a flowchart illustrating a sequence of processing for correcting an operation amount by the motor drive control device according to the present embodiment.

FIG. 6 is a flowchart illustrating a sequence of the processing of correcting the operation amount by the motor drive control device 1 according to the present embodiment.

For example, when the DC voltage Vdc is input to the motor drive control device 1 and the motor drive control device 1 is then started, the motor drive control device 1 first determines whether the drive command signal Sc is input (step S11). When the drive command signal Sc is not input (step S11: NO), the motor drive control device 1 waits until the drive command signal Sc is input.

When the drive command signal Sc is input (step S12: YES), the motor drive control device 1 starts feedback control of the motor 4 (step S12). Specifically, the feedback control unit 12 calculates the operation amount Sad by the PID control calculation in the feedback control unit 12 so that the rotation speed S3 of the motor 4 matches the target rotation speed S1 specified by the drive command signal Sc, and the drive control signal generation unit 14 generates the drive control signal Sd based on the operation amount Sad (=S2). Thus, the motor 4 can rotate.

The motor drive control device 1 then starts monitoring the motor current (step S13). Specifically, the current sampling unit 17 starts measuring (sampling) the voltage input from the current detection circuit 6 as the motor current, and the fluctuation determination unit 18 starts processing of determining whether the motor current fluctuates based on the sampling value of the motor current measured by the current sampling unit 17.

Next, the motor drive control device 1 determines whether the drive command signal Sc has been changed (step S14). Specifically, when the drive command signal Sc is input in a state where the drive command signal Sc is not input, or when the target rotation speed S1 newly specified by the drive command signal Sc does not match the target rotation speed S1 specified at an immediately previous time, the motor drive control device 1 determines that the drive command signal Sc has been changed (step S14: YES). In this case, the correction instruction unit 19 resets the count value of the correction counter (n→0), stops the correction of the operation amount, and returns to step S14 (step S15).

On the other hand, when the target rotation speed S1 specified by the drive command signal Sc matches the target rotation speed S1 specified at an immediately previous time, the motor drive control device 1 determines that the drive command signal Sc has not been changed (step S14: NO), and determines whether a fluctuation of the motor current has been detected (step S16).

Specifically, the fluctuation determination unit 18 determines whether a periodic fluctuation of the motor current has been detected. When a periodic fluctuation of the motor current is detected (step S16: YES), the correction instruction unit 19 increments the count value of the correction counter 20 (step S17).

Next, the motor drive control device 1 corrects the operation amount Sad calculated by the feedback control unit 12 (step S18). Specifically, as described above, the correction unit 13 corrects the operation amount Sad so that at least one of the duty ratio of the PWM signal as the drive control signal Sd and the period for updating the duty ratio is adjusted according to the count value of the correction counter 20, and outputs the corrected operation amount S2. Thereafter, the motor drive control device 1 returns to step S14.

On the other hand, when no periodic fluctuation of the motor current is detected (step S16: NO), the motor drive control device 1 determines whether the count value of the correction counter 20 is zero (step S19). When the count value of the correction counter 20 is not zero, that is, when the count value is one or more (step S19: NO), the motor drive control device 1 corrects the operation amount Sad calculated by the feedback control unit 12 according to the count value of the correction counter 20 (step S18).

When the count value of the correction counter 20 is zero (step S19: YES), the motor drive control device 1 does not correct the operation amount Sad (step S20). Thereafter, the motor drive control device 1 returns to step S14.

As described above, the motor drive control device 1 according to the present embodiment corrects the operation amount based on the feedback control when detecting the fluctuation of the current (motor current) flowing through the motor 4. Thus, it is possible to automatically correct the operation amount Sad in the feedback control without depending on a result of observation of the motor operation state by a human.

Specifically, the motor drive control device 1 corrects the operation amount Sad calculated by the feedback control unit 12 when detecting a periodic fluctuation of the motor current. Accordingly, when an unstable state where the rotation speed of the motor fluctuates with a periodic beat at intervals of several seconds occurs, the motor drive control device 1 can detect the unstable state by itself and automatically correct the operation amount Sad in the feedback control (e.g., PID control), so that the rotation of the motor 4 can be stabilized.

Moreover, the motor drive control device 1 further includes a correction counter 20 counting the number of times the fluctuation of the motor current has been detected by the current fluctuation detection unit 16, and the motor drive control device 1 increases the amount of correction of the operation amount Sad in a stepwise manner according to the count value of the correction counter 20.

Accordingly, the correction of the operation amount Sad is executed in a stepwise manner until the fluctuation of the motor current is eliminated, so that the appropriate operation amount necessary for achieving the stable rotation of the motor can be automatically set.

In addition, the motor drive control device 1 performs, as the correction of the operation amount Sad, at least one of reducing the operation amount Sad to be provided to the drive control signal generation unit 14 and lengthening the period for updating the operation amount Sad to be provided to the drive control signal generation unit 14.

Specifically, the motor drive control device 1 corrects the operation amount Sad so that the value specifying the duty ratio of the drive control signal Sd (PWM signal) calculated by the feedback control unit 12 becomes small. Accordingly, as described above, since the power (current) provided to the motor 4 (coil) can be made small, an unstable state of the motor caused by an excessive operation amount based on the feedback control calculation can be eliminated.

In addition, the motor drive control device 1 corrects the operation amount Sad in a manner to lengthen the period for updating the value specifying the duty ratio of the drive control signal Sd (PWM signal) to be provided to the drive control signal generation unit 14. Thus, since the substantial feedback control period is lengthened, the power provided to the motor 4 can be changed gently, and the unstable state of the motor caused by the excessive operation amount based on the feedback control calculation can be eliminated.

Expansion of Embodiments

The invention made by the present inventors has been specifically described above based on the embodiments. However, the present invention is not limited to the embodiments, and it is needless to say that various modifications can be made without departing from the gist of the present invention.

For example, in the above embodiments, the feedback control has been described as PID control, but the feedback control is not limited to PID control and may be PI control or the like.

Further, in the above-described embodiments, a case where the correction unit 13 corrects the operation amount when the fluctuation determination unit 18 of the motor drive control device 1 detects the periodic fluctuation of the motor current has been described as an example, but the embodiments are not limited to this case, and the correction unit 13 may correct the operation amount immediately when the fluctuation determination unit 18 detects the fluctuation of the motor current.

In the above embodiments, an example of calculating the difference between the maximum value and the minimum value of the sampling values of the motor current and determining that the motor current fluctuates when the difference exceeds a predetermined threshold value has been described, but the embodiments are not limited to this example. For example, the fluctuation determination unit 18 may calculate the average value of the sampling values of the motor current for each fixed period, and determine that the motor current fluctuates when the difference between the average values of the motor currents in the adjacent periods exceeds a predetermined threshold value.

The flowchart described above is an example, and is not limited to this example, and for example, other processes may be inserted between the steps, or the processes may be parallelized.

In the above embodiments, the type of motor 4 is not limited to a brushless DC motor. The motor 4 is not limited to a single-phase, and may be a multiple-phase (e.g., three-phase) brushless DC motor.

REFERENCE SIGNS LIST

1 Motor drive control device
2 Control circuit
3 Drive circuit
4 Motor
5 Position detection device
6 Current detection circuit
11 Drive command signal analysis unit
12 Feedback control unit
13 Correction unit
14 Drive control signal generation unit
15 Rotation speed calculation unit
16 Current fluctuation detection unit
17 Current sampling unit
18 Fluctuation determination unit
19 Correction instruction unit
20 Correction counter
100 Motor unit
S1 Target rotation speed
S2 Operation amount
S3 Rotation speed
S5 Correction instruction signal
Sad Operation amount
Sc Drive command signal
Sd Drive control signal
Sf Fluctuation detection signal
Sp Position detection signal
Lvdd Power line
Vdc DC voltage
Gp Proportional gain
Gi Integral gain
Gd Differential gain
Sdif Rotation speed error
Sgp Proportional calculation value
Sgi Integral calculation value
Sgd Differential calculation value
21 Subtractor
22 PID controller
23 Proportional calculation unit
24 Integral calculation unit
25 Differential calculation unit
26 Adder

The invention claimed is:

1. A motor drive control device, comprising:
a control circuit configured to generate a drive control signal for controlling drive of a motor; and
a drive circuit configured to drive the motor in accordance with the drive control signal, wherein
the control circuit includes:
a feedback control unit configured to calculate an operation amount of the motor such that a rotation speed of the motor matches a target rotation speed;
a drive control signal generation unit configured to generate the drive control signal based on the operation amount;
a current fluctuation detection unit configured to detect a fluctuation of a current flowing through the motor;
a correction instruction unit configured to instruct correction of the operation amount when the fluctuation of the current flowing through the motor is detected by the current fluctuation detection unit; and
a correction unit configured to correct the operation amount calculated by the feedback control unit in accordance with an instruction from the correction instruction unit, and
when the correction of the operation amount is not instructed from the correction instruction unit, the correction unit provides the operation amount calculated by the feedback control unit to the drive control signal generation unit without correcting the operation amount, and when the correction of the operation amount is instructed from the correction instruction unit, the correction unit corrects the operation amount calculated by the feedback control unit and provides the operation amount to the drive control signal generation unit.

2. The motor drive control device according to claim 1, wherein
the correction instruction unit instructs the correction of the operation amount when a periodic fluctuation of the current flowing through the motor is detected by the current fluctuation detection unit.

3. The motor drive control device according to claim 1, wherein
the correction instruction unit further includes a correction counter configured to count the number of times the fluctuation of the current flowing through the motor is detected by the current fluctuation detection unit, and
the correction unit increases an amount of the correction of the operation amount in a stepwise manner according to the count value of the correction counter.

4. The motor drive control device according to claim 1, wherein
the correction unit performs, as the correction of the operation amount, at least one of reducing the operation amount to be provided to the drive control signal generation unit and lengthening a period for updating the operation amount to be provided to the drive control signal generation unit.

5. The motor drive control device according to claim 4, wherein the drive control signal is a PWM signal,
the feedback control unit calculates a value specifying a duty ratio of the PWM signal as the operation amount, and the correction unit corrects the operation amount such that the value specifying the duty ratio calculated by the feedback control unit becomes smaller.

6. The motor drive control device according to claim 4, wherein
the drive control signal is a PWM signal, and the feedback control unit calculates a value specifying a duty ratio of the PWM signal as the operation amount, and
the correction unit corrects the operation amount such that a period for updating and outputting the value specifying the duty ratio calculated by the feedback control unit becomes longer.

7. A motor unit comprising:
the motor drive control device according to claim 1; and
the motor.

8. A motor drive control method by a motor drive control device, the motor drive control device including: a control circuit configured to generate a drive control signal for controlling drive of a motor; and a drive circuit configured to drive the motor in accordance with the drive control signal, the motor drive control method comprising:
a first step of calculating, by the control circuit, an operation amount of the motor such that a rotation speed of the motor matches a target rotation speed;

a second step of generating, by the control circuit, the drive control signal based on the operation amount;

a third step of correcting, by the control circuit, the operation amount calculated in the first step when a fluctuation of current flowing through the motor is detected; and a fourth step of not correcting, by the control circuit, the operation amount calculated in the first step when the fluctuation of current flowing through the motor is not detected.

* * * * *